United States Patent [19]
Christoff

[11] Patent Number: 5,419,154
[45] Date of Patent: May 30, 1995

[54] BEVERAGE CONTAINER WITH MOUNTING BRACKET

[76] Inventor: Mark P. Christoff, 464 Latham St., Maywood, N.J. 07607

[21] Appl. No.: 219,039

[22] Filed: Mar. 28, 1994

[51] Int. Cl.[6] ............................................. F25D 3/08
[52] U.S. Cl. ...................................... 62/457.3; 62/371; 220/709; 220/713; 248/311.2; 224/41
[58] Field of Search .................. 62/371, 372, 457.1, 62/457.2, 457.3, 457.4; 220/751, 481, 709, 713, 716, 719; 224/42, 45 R, 30 A, 36, 39, 41; 248/311.2

[56] References Cited

U.S. PATENT DOCUMENTS

| | | | |
|---|---|---|---|
| 3,131,842 | 5/1964 | Dingle, Jr. et al. | 248/311.2 |
| 3,317,171 | 5/1967 | Kramer | 248/311.2 |
| 3,389,883 | 6/1968 | Johnson | 248/311.2 |
| 3,578,199 | 5/1971 | Duncan | 248/311.2 |
| 4,270,724 | 6/1981 | McMullen | 248/311.2 |
| 4,351,809 | 11/1982 | Held et al. | 62/457.4 |
| 4,541,555 | 9/1985 | Miree | 224/41 |
| 4,852,774 | 8/1989 | Crawford | 220/296 |
| 4,981,022 | 1/1991 | Snyder | 62/457.3 |
| 4,998,700 | 3/1991 | McKaig | 248/311.2 |
| 5,001,907 | 3/1991 | LaCroix et al. | 62/457.4 |
| 5,007,612 | 4/1991 | Manfre | 248/311.2 |
| 5,129,238 | 7/1992 | Schwartz et al. | 62/457.3 |
| 5,152,489 | 10/1992 | Christensen et al. | 228/311.2 |
| 5,238,160 | 8/1993 | Faulds | 224/32 R |
| 5,244,114 | 9/1993 | Traegde | 220/737 |
| 5,251,777 | 10/1993 | McMahon | 248/311.2 |

FOREIGN PATENT DOCUMENTS

| | | | |
|---|---|---|---|
| 0094235 | 11/1983 | European Pat. Off. | 220/713 |
| 1175582 | 12/1969 | United Kingdom | 220/709 |

Primary Examiner—John M. Sollecito
Attorney, Agent, or Firm—Reese Taylor

[57] ABSTRACT

A beverage container is provided for use with a golf cart or the like having a support member. The container includes a body having a central beverage receiving cavity which extends from the closed bottom of the body to the open top end of the body. The container also includes means for receiving a freezable gel, the means being disposed within the beverage receiving cavity. A cap is provided to be releasably attached to the open top end of the body. The container further includes means for attaching the body to the support member.

12 Claims, 8 Drawing Sheets

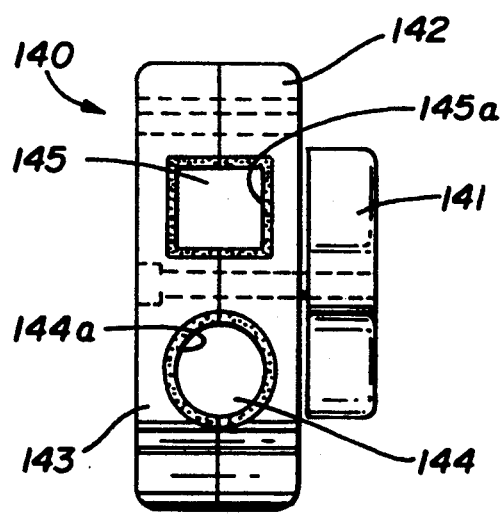
FIG. 12
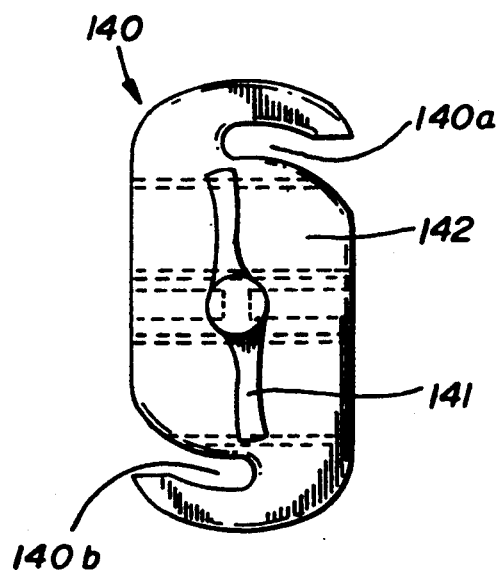
FIG. 15
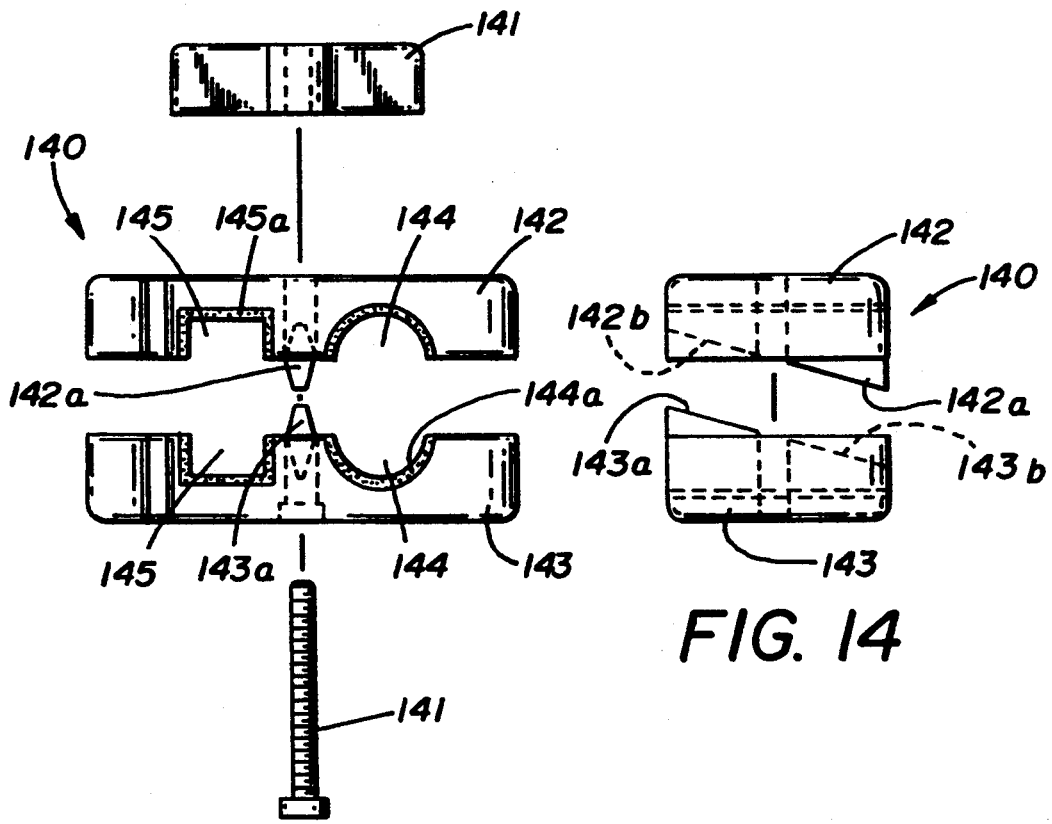
FIG. 13
FIG. 14

BEVERAGE CONTAINER WITH MOUNTING BRACKET

BACKGROUND OF THE INVENTION

This invention relates in general to beverage containers and relates in particular to a beverage container which is portable and which can provide insulated protection for the beverage and is releasably attachable to the structural member of a golf cart or the like.

DESCRIPTION OF THE PRIOR ART

It is well known that golfers, bicyclists, or other people engaged in recreational pursuits, will often desire to carry with them a beverage of some sort. This can be done in a number of ways, but it is felt that, with particular emphasis on golf, for example, it is desirable to develop a device which can be attached to the golf cart, for example, and which will easily and quickly attach thereto and remove therefrom and which will maintain the desired temperature of the contents of the container, whether it be hot or cold.

There are numerous patents showing chillable mugs which will maintain a relatively constant temperature of the contents over a period of time. Examples are disclosed in Held U.S. Pat. Nos. 4,357,809 and LaCroix 5,001,907 which disclose integrally molded, double walled mugs including a sealed interior space receiving a freezable gel. The prior art also discloses a removable closure to a mug having an aperture therein for a straw, such as in Schwartz U.S. Pat. No. 5,129,238 wherein the container is also refrigerated by a central frozen gel compartment.

An interrupted thread, quick release cap is also, per se, known in the art, as can be seen in Crawford U.S. Pat. No. 4,852,774.

Means for attaching mugs of various types to supporting structure are shown, for example, in Johnson U.S. Pat. No. 3,389,883 wherein a bifurcated receiving bracket and a tubular dispenser have an essentially T-shaped projection for freely hanging the dispenser from the bracket.

The broad concept of attaching a container to a golf cart specifically can also be seen in Christensen U.S. Pat. Nos. 5,152,489 and Dingle 3,131,842 which disclose, for example, bolted, semi-circular plates with a pivoted insulated beverage holder or a split damp with inserts to accommodate circular or square golf cart frames. McMullen U.S. Pat. No. 4,270,724 also shows a drink holder adaptable for either round or rectangular cross-sectioned fishing pole holders.

However, it will be noted that none of the prior art, either alone or separate, shows a self-refrigerated beverage container having a canted, variably positionable cap with a straw aperture and a bracket for attachment to a golf cart standard or the like.

SUMMARY OF THE INVENTION

It is accordingly, a principle object of this invention to provide a beverage container, containing a freezable gel and adapted to be releasably mountable on a golf cart handle, golf cart canopy support, bicycle frame or the like and having a variably positionable lid or cap.

It has been found that the above object can be facilitated by providing an integrally molded body having an interior cavity for receipt of the beverage and an interior core for receipt of the freezable gel.

It has also been found that this object can be furthered by providing a projecting handle diametrically opposed to a bracket attachment wedge so that the body of the container can be quickly and easily attached to a mounting bracket.

It has further been found that an improved mounting bracket can be provided which is quickly and readily attached to and removed from a golf cart handle, golf cart canopy, bicycle frame or the like and that such a mounting bracket can have hook and loop style retaining straps so that the bracket may accommodate a variety of supporting members.

It has further been found that the principal object of this invention can be achieved by providing a cap for the container and a threaded end on the container with interrupted threads so that the cap may be positioned in selective positions relative to the body of the container. By providing a straw hole in one quadrant of the cap and a sloped top having a high and low end, the location of the straw aperture can be variably adjusted.

Accordingly, production of an improved beverage container of the type above described becomes the principal object of this invention with other objects thereof becoming more apparent upon a reading of the following brief specification considered and interpreted in view of the accompanying drawings.

BRIEF DESCRIPTION OF THE DRAWINGS

FIG. 12 is a top plan view of the mounting bracket of the alternate embodiment.

FIG. 13 is an exploded view of the mounting bracket of the alternate embodiment.

FIG. 14 is a side elevation view showing the bracket sections of the alternate embodiment.

FIG. 15 is a side elevational view of the components of the mounting bracket of the alternate embodiment.

BRIEF DESCRIPTION OF THE PREFERRED EMBODIMENTS

Figure 1:
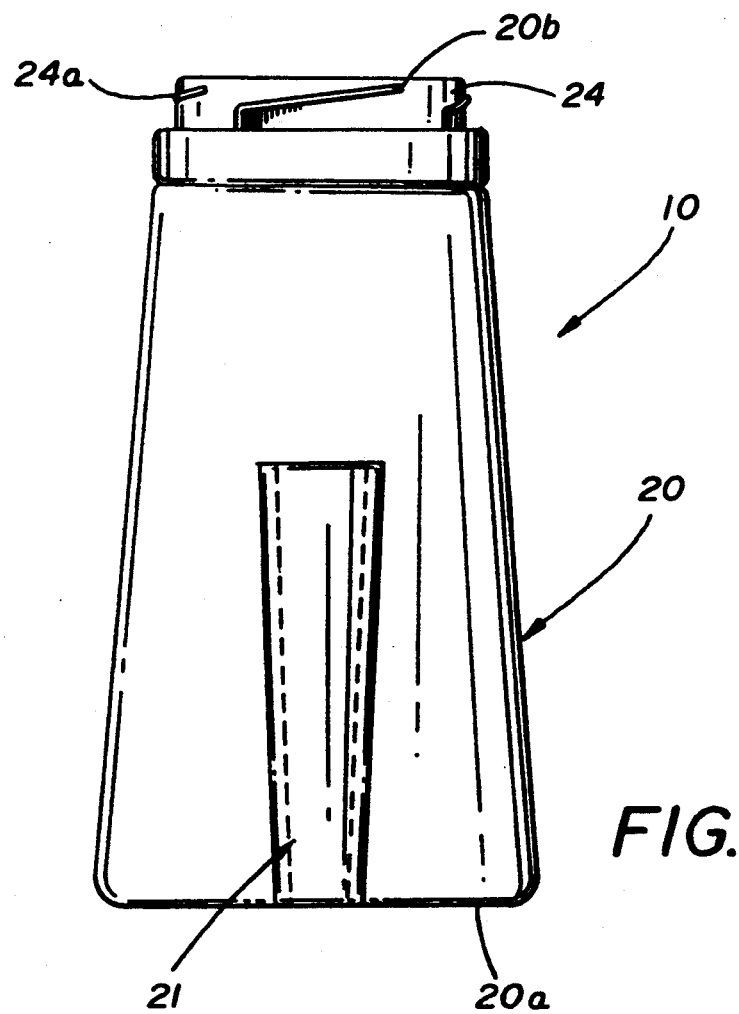
FIG. 1 is a side elevational view of the primary embodiment of the improved container with the cap removed.
Figures 2, 3:
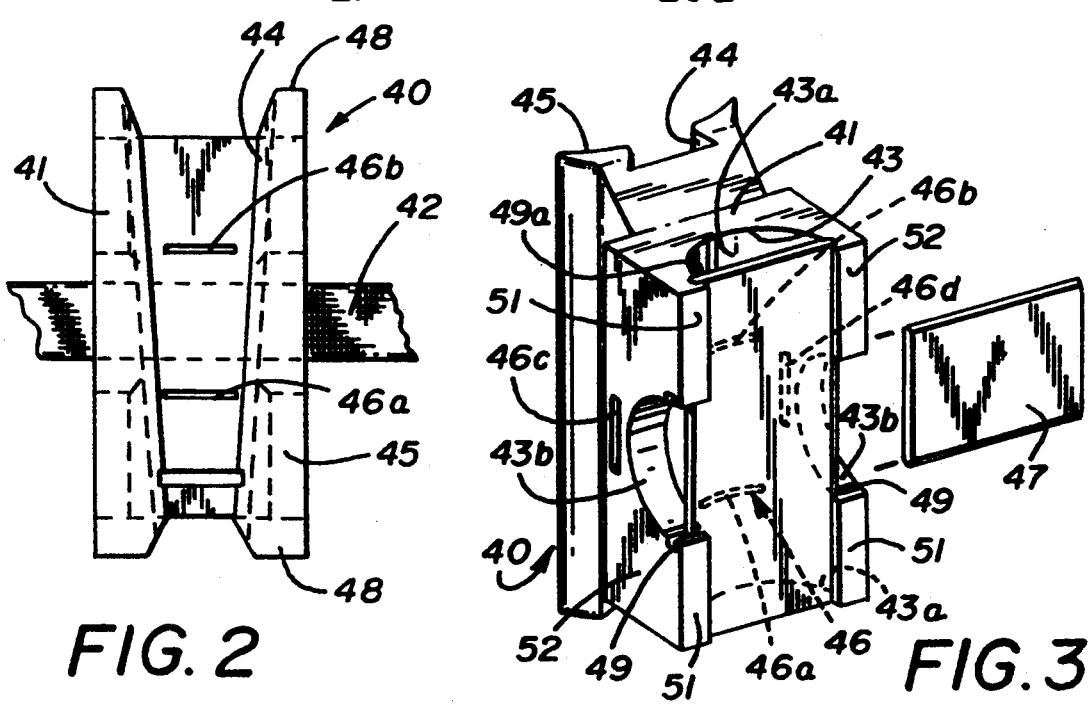
FIG. 2 is a front elevational view of the mounting bracket of the primary embodiment.
FIG. 3 is a perspective view showing the mounting bracket of the primary embodiment in conjunction with the square support adapters.
Figure 4:
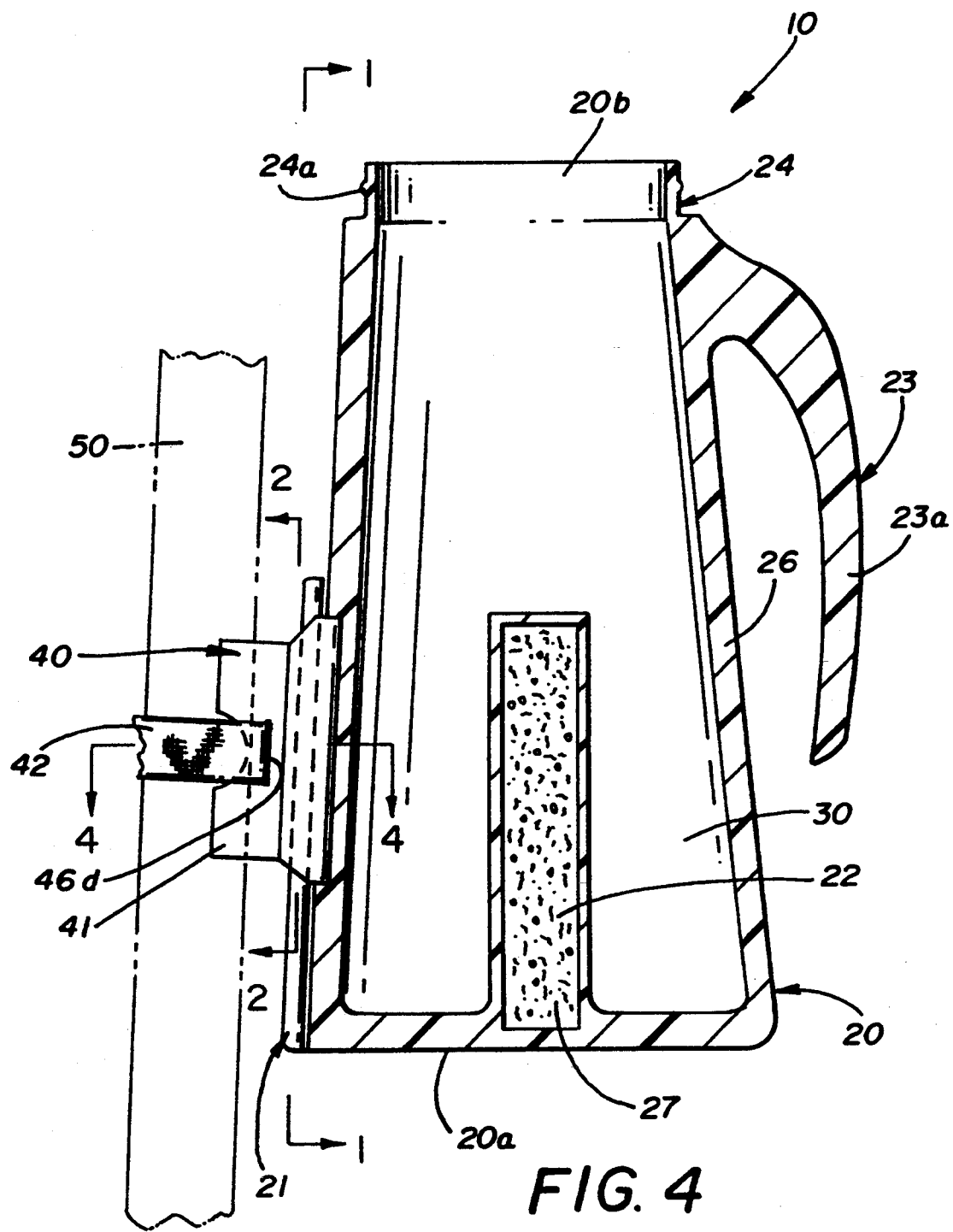
FIG. 4 is a perspective view showing the assembled primary embodiment of the beverage container in place on a vertical support.
Figure 5:
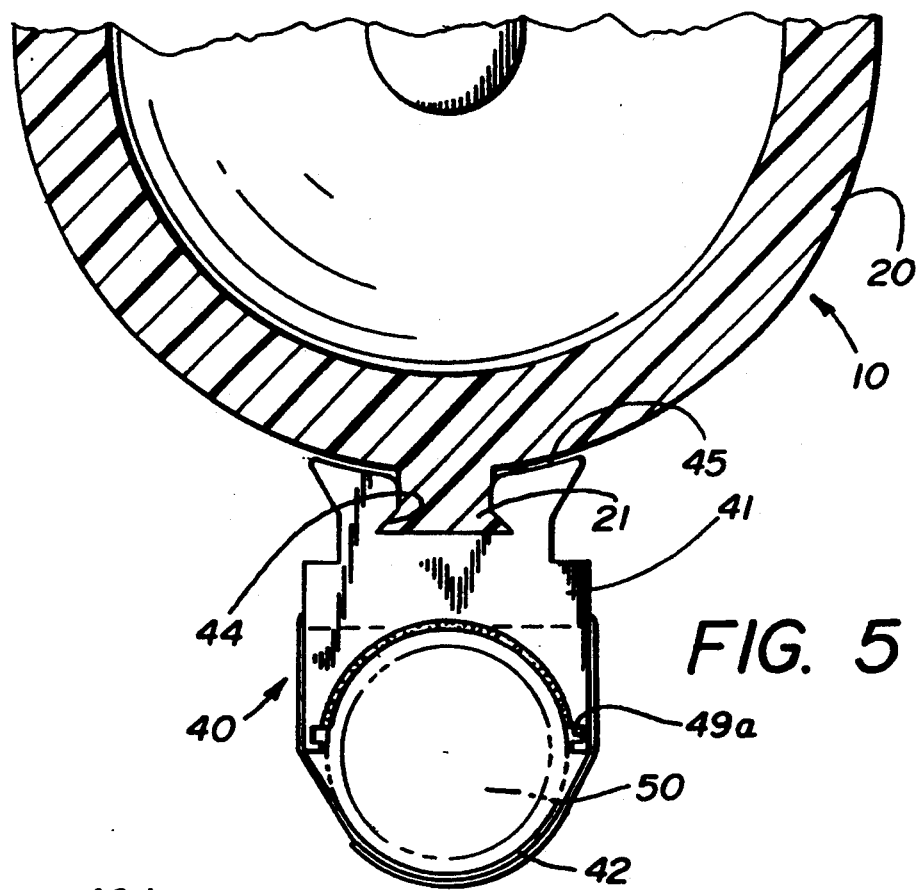
FIG. 5 is a partial top plan view of the primary embodiment of the container in place on a round vertical support.
Figure 6:
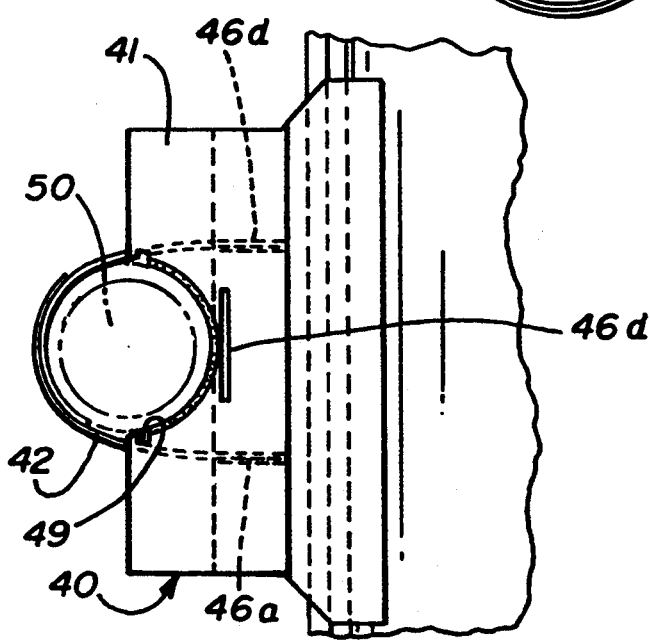
FIG. 6 is a partial side elevational view of the primary embodiment of the container in place on a round lateral support.

Referring first to FIGS. 1 and 4 of the drawing, it will be seen that a primary embodiment of the improved container, generally indicated by the numeral 10, includes a main body 20, a handle 23, a mounting wedge 21, and a mounting bracket 40.

The body 20 has a closed bottom end 20a and an open top end 20b. Disposed inwardly from the bottom wall 20a is a core 22 which, in the form of the invention illustrated in FIG. 4 of the drawings, extends up from the bottom surface into the beverage receiving cavity 30. This core 22 is intended to be filled with a freezable gel 27. The body 20 further has an insulator wall 26 which, once the gel is frozen, will maintain that condition for a fixed period of time.

The opposed open end of the body 20b has a reduced diameter portion 24 which has an interrupted thread indicated by the numeral 24a.

Projecting from the side wall of the body 20 is a handle member 23 which serves as a handle for use by the user of the container. To that end, the handle 23 has a hand grip portion 23a.

A dovetail shaped mounting wedge 21 also projects from the side wall of the body 20 directly opposite the handle 23. As can be seen the mounting wedge is tapered such that the upper portion thereof is of a greater width than the lower portion.

Figures 7, 8:
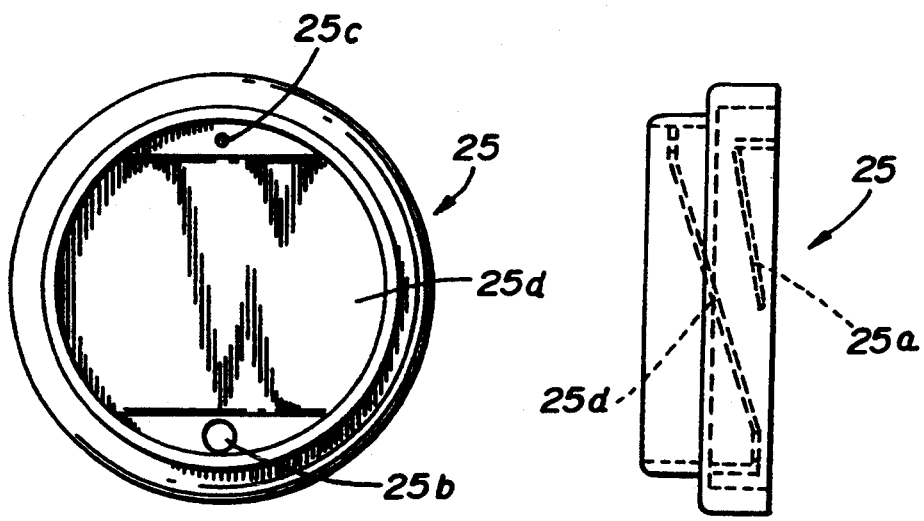
FIG. 7 is a top plan view of the cap.
FIG. 8 is a side elevational view of the cap.
Figure 11:
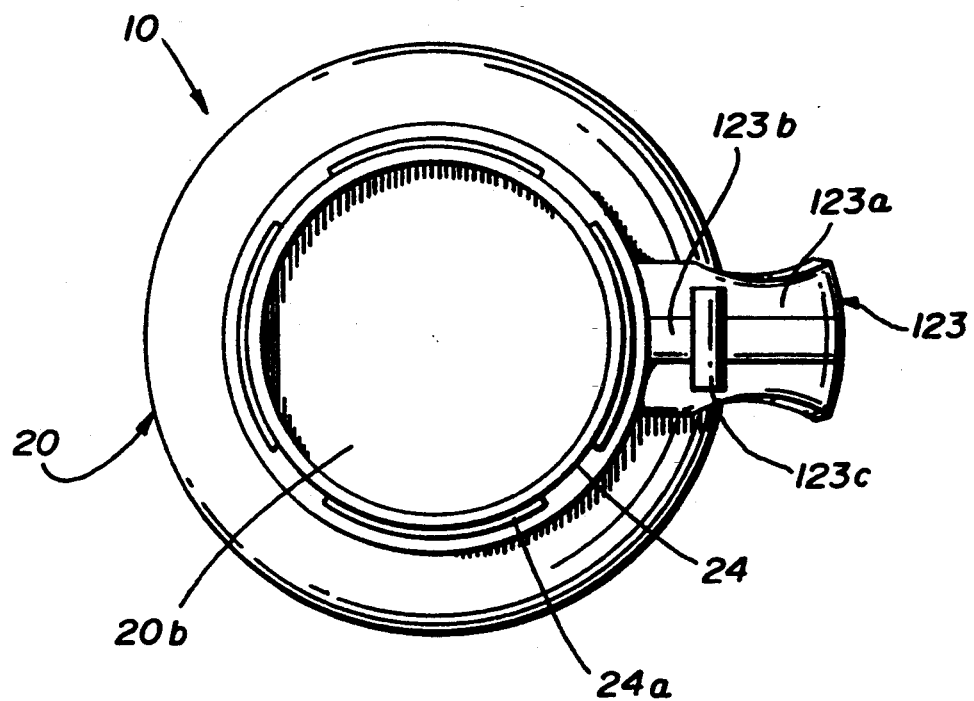
FIG. 11 is a top plan view of the container of FIG. 9.

Referring to FIGS. 7 and 8 of the drawing, it will be seen that the top cap 25 has a threaded portion 25a which can engage the interrupted thread 24a of the reduced diameter portion 24 of the body 20 for quick attachment thereto. This feature also makes it possible to position the top cap 25 as desired.

Figure 9:
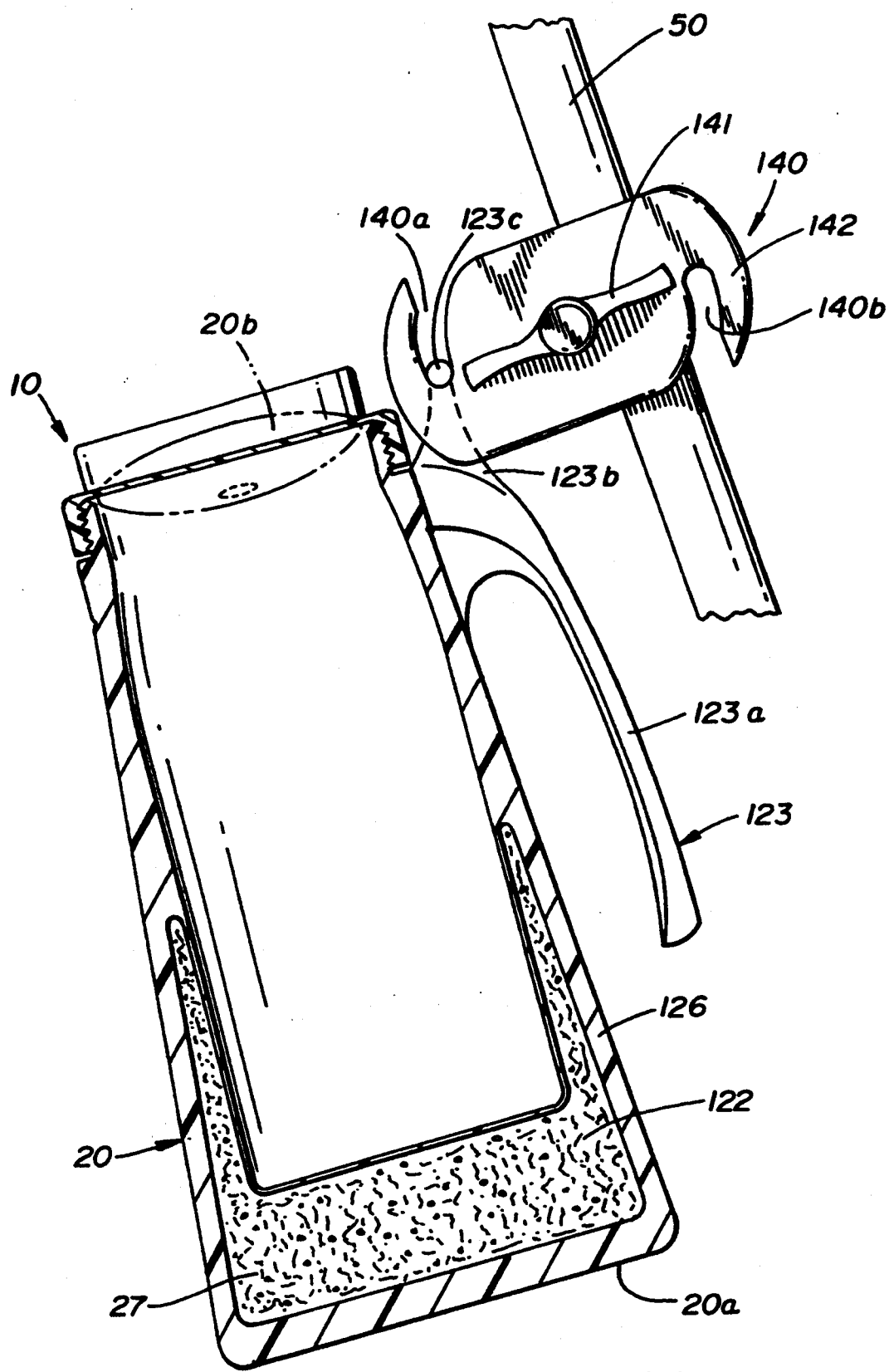
FIG. 9 is a perspective view showing an assembled alternate embodiment of the beverage container in place on a golf cart support.
Figure 10:
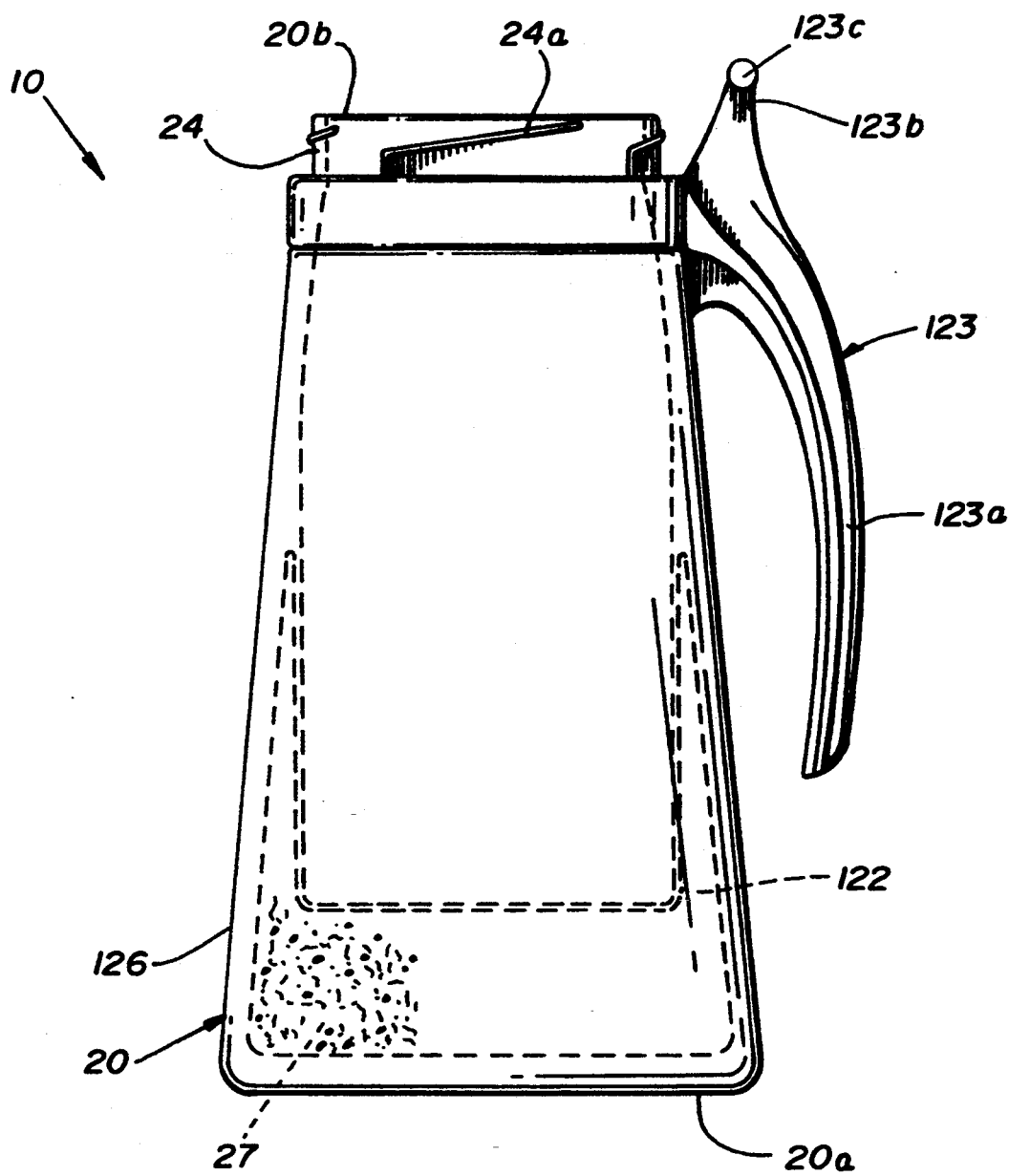
FIG. 10 is a side elevational view of an alternate embodiment of the improved container with the cap removed.

In that regard, it will be noted that a straw receiving opening 25b and a vent opening 25c are provided in the top cap. It will also be noted from FIGS. 7 and 8 of the drawings that the top cap, which is generally cylindrical in configuration, has a sloping top wall 25d which slopes from a high point to a low point and that the straw receiving opening is disposed in the low point. This feature, taken with the interrupted thread feature, makes it possible to position the top cap with the straw receiving opening at the desired point. As can be seen in FIG. 9, with the top cap in place, the container can be easily utilized.

Turning next, then to FIGS. 2-6, it will be noted that a mounting bracket 40 is provided for attachment to a structural member 50 such as a golf cart handle, cart canopy support, bicycle frame or the like.

The bracket 40 includes a main body portion 41 and a strap portion 42. The main body portion 41 is preferably molded from an appropriate thermoplastic material and includes a dovetail notch 44 in the front face 45 thereof. The dovetail notch 44 goes the entire length of the main body 41 and is tapered from top to bottom the uppermost portion of the notch being the widest and the lowermost portion being the narrowest. As such, the tapered dovetail notch 44 may matingly receive the mounting wedge 21 of the container 10. The strap 42 is preferably manufactured from a length of an appropriate nylon webbing or other similar material. It is preferred that a hook and loop type fastening system employed to join the opposite ends of the strap for mounting. As such, the loop portion would be attached to one end of the strap and the hook portion would be attached to the opening using a generous amount of each portion so as to afford the maximum adjustability of the strap. It is, however, contemplated that a buckle, snap or other appropriate means may be used to join the opposite ends of this trap without departing from the spirit of the invention.

The main body portion 41 further includes a plurality of strap receiving slots 46. As can be seen, a first pair of strap receiving slots 46a and 46b are situated proximal to and parallel with the opposing end faces 48 at the main body. Similarly, a second pair of receiving strap slots 46c and 46d are located proximal to and parallel with the opposite side faces 52 of the main body 41. As should be apparent, the strap 42 may be inserted into the receiving slot 46a and out of the receiving slot 46b for use of the bracket 40 in conjunction with a horizontal support member 50. Conversely, the strap 42 may be inserted in the slot 46c and out of the slot 46d for use of the bracket 40 in conjunction with a vertical support member 50. The strap ends may be pulled taut around the support member and secured to one another using the hook and loop fastener to ensure a snug and stable attachment thereto.

As shown, the bracket 40 further includes concave support member receiving notches 43 which permit the bracket 40 to be used in conjunction with a support member 50 having a circular or semicircular cross section. As can be seen, concave receiving notches 43a,43b are aligned orthogonally with relation to the dovetail notch 44 such that the bracket 40 may engage a lateral support member 50. Similarly, a second pair of concave receiving notches 43b,43b are provided perpendicular to the notches 43a,43a such that the bracket 40 may engage a vertical support member 50. An adapter plate 47 is provided for use with the bracket 40 in the event that it is desired to use the bracket 40 in conjunction with a flat support member 50 or a support member 50 having a square cross section. Such is accomplished by merely inserting the adapter plate 47 into adapter receiving slots provided in the bracket 40 proximal to the rear face 51 thereof and parallel with each of the concave receiving notches. As such, slots 49 are associated with the receiving notches 43a and slots 49a are associated with receiving notch 43b. When the adapter pate 47 is in place, the bracket may be used in conjunction with a flat or square support member 50 without the risk of angular displacement due to the concavity of the receiving notches.

The present invention is easily utilized for a variety of recreational activities. It is first necessary to place the body 20 of the invention in a freezer for a period of time sufficient to allow the freezable gel 27 to freeze solid. The beverage receiving cavity may then be filled with the desired beverage. It has been found that the best results are obtained by filling the mug 10 with a beverage which has been chilled beforehand. This allows the mug 10 to maintain the beverage at a lower temperature for a longer period of time. Once the mug 10 has been filled, the top cap 25 may be installed over the open top end 20b of the body 20. This is accomplished by simply placing the top cap 25 over the open top end 20b and rotating the top cap 25 roughly 90 degrees clockwise to frictionally engage the interrupted threads 24a of the body 20. It should be noted that the top cap 25 may be positioned in a variety of positions by merely rotating the top cap 25 to effect the desired position upon engagement with the interrupted threads 24a of the body 20. After the top cap 25 has been installed on the filled mug 10 a straw (not shown) may be inserted in the straw receiving opening 25b.

The mounting bracket 40 may be utilized by first determining whether it is desired to mount the bracket to a vertical support member or a lateral support member. If it is desired that the bracket 40 be mounted to a vertical member 50, the strap 42 should be inserted into the slot 46c and out of the slot 46d. The bracket 40 may then be abuttingly placed against the support member 50 and the straps pulled snugly around the support member 50 and secured together using the hook and loop fasteners. The bracket may likewise be engaged on a lateral support member by instead inserting the strap in the slot 46a, and out of the slot 46b and engaged to the support member as above. This will maintain the dovetail notch 44 substantially vertical.

The mug 20 may then be placed in the bracket 40 by allowing the dovetail wedge 21 to wedgingly engage the dovetail notch of the bracket 40. The body is easily retrieved from the bracket 40 by simply lifting the body 20 by the handle 23 to remove it from the dovetail notch 44.

Another embodiment of the present invention is illustrated in FIGS. 9-15, in which like reference numerals designate like parts. In this embodiment the body 20 has a closed bottom end 20a and an open top end 20b. Disposed inwardly from the bottom wall 20a is a cavity 122 which in the form of the invention illustrated in FIG. 10 of the drawings, extends across the bottom surface and up along the side walls of the container body 20. This cavity is intended to be filled with a freezable gel 27. Interposed between the walls of the cavity 122 and the exterior wall of the body 20 is an insulator wall 126 which, once the gel is frozen, will maintain that condition for a fixed period of time.

As in the first embodiment, the opposite open end of the body 20 has a reduced diameter portion 24 which has an interrupted thread indicated by the numeral 24a.

Projecting from the side wall of the body 20 is a handle member 123 which serves both as a handle for use by the user of the container and a means for securing the container to the mounting bracket. To that end, the handle 123 has a hand grip portion 123a and a projecting bracket engagement portion 123b which terminates in a T-shaped bracket engagement member 123c.

With reference to FIGS. 9 and 12-15, it will be noted that an alternative mounting bracket 140 is provided to be used with the second embodiment. The bracket 140 includes a thumb screw 141 which permits quick positioning of the two bracket sections 142 and 143. These bracket sections 142 and 143 are mirror images of each other. Each includes a semi-circular interior recess 144 which is lined with rubber or some other type of antifriction material indicated at 144a. Each of these sections also has a rectangular-shaped recess 145, again lined with rubber or some such material 145a. It will be readily apparent that when the two sections 142 and 143 are mated together, a rectangular opening and a circular opening will be provided as shown in FIG. 12 of the drawings. This permits the bracket to be adaptable to a support member such as 50, which has either a circular or rectangular cross-section.

The bracket sections 142 and 143 also have cam surfaces 142a, 142b and 143a, 143b, which will insure proper positioning thereof so as to bring the recesses 144 and 145 into proper alignment and also so as to bring the slots or grooves 140a and 140b into alignment.

It will be noted, from FIG. 9 of the drawings, that when the bracket is affixed to the member 50 and tightened down by means of the screw 141, one of the grooves 140a, 140b will be in alignment and will provide a receiving member for the T-shaped member 23c of the handle.

Figure 16:
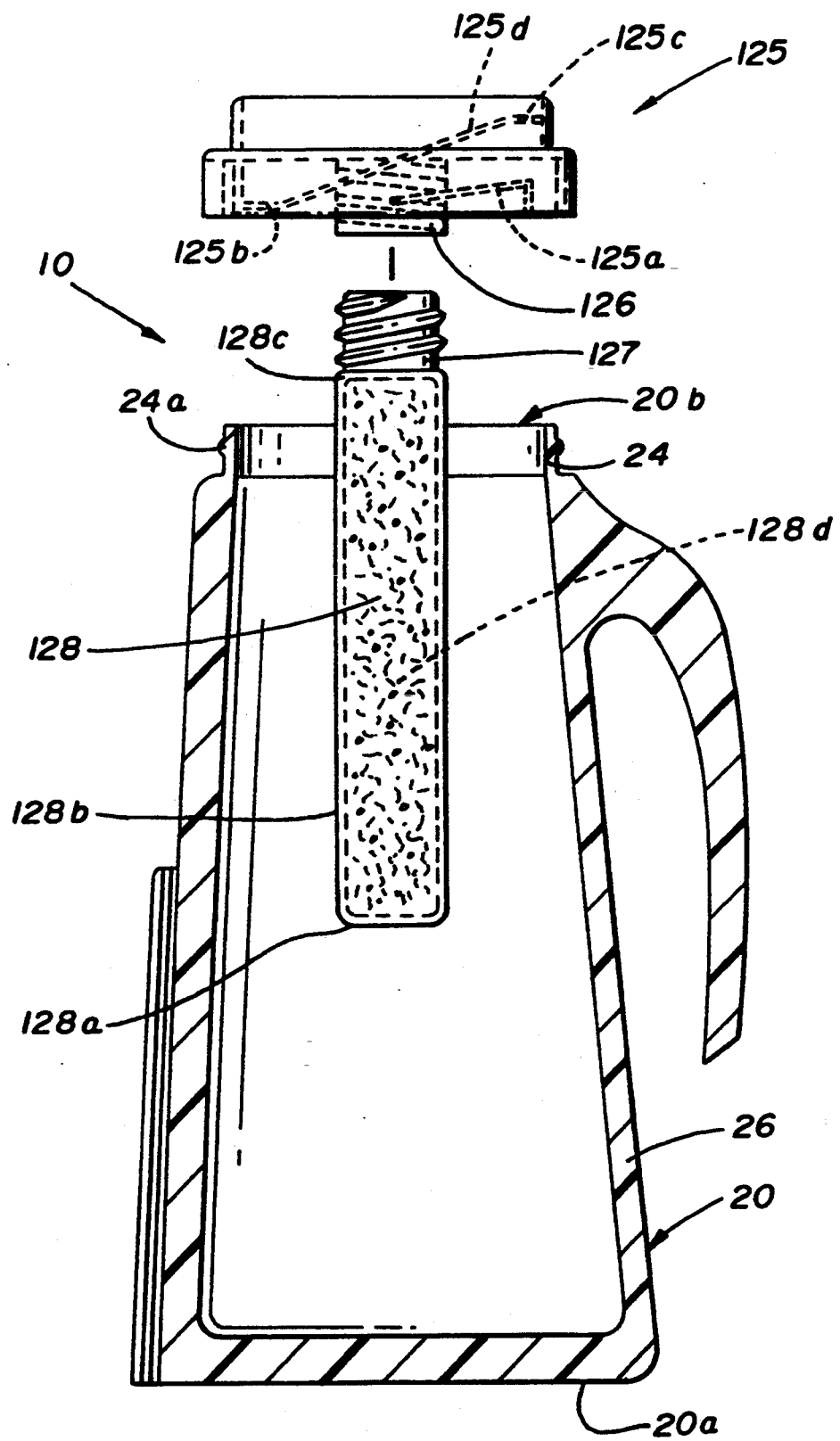
FIG. 16 is a side elevational view of yet another embodiment of the containers.

Yet another embodiment of the present invention is illustrated in FIG. 16 in which like numbered reference numerals designate like parts. In this embodiment, the body 20 has a closed bottom end 20a, an open top end 20b, and an insulated sidewall 26. The opposed open end 20b of the body 20, again, has a reduced diameter portion 24 which has in interrupted thread indicated by the numeral 24a.

This embodiment further provides a top cap 125, having a threaded portion 125a which can engage the interrupted threads 24a of the reduced diameter portion 24 of the body for quick attachment thereto. A straw receiving opening 125b and a vent opening 125c are provided in the top cap. It will be noted from FIG. 14 of the drawing that the top cap 125, which is generally cylindrical in configuration, has a sloping top wall 125d which slopes from a high point to a low point and that the straw receiving opening is disposed in the low point. It will also be noted that positioned at the center of the underside of the top cap 125 is a threaded female receiving boss 126 which is adapted to receive a threaded male member 127. The threaded male member 127 is incorporated into a hollow gel filled insert 128. The insert 128 includes a closed bottom end 128a, a sidewall 128b and a top end 128c which is closed by the threaded male member 127. A hollow gel receiving chamber 128d is adapted to be filled with a freezable gel. This gel filled insert may be placed in a freezer apart from the cap 125 and the body 20 to be frozen. After the insert 128 is frozen, it may be matingly threaded into the female boss 126 on the top cap 125. The body 20 is then filled with an appropriate beverage and the top cap installed as previously described. It should be apparent that with the top cap and insert 128 installed, the gel filled insert will be substantially submerged in the beverage. As such, the insert 128 serves to maintain the beverage at a much cooler temperature than would otherwise be possible.

While a full and complete description of the invention has been set forth in accordance with the dictates of the patent statutes, it should be understood that modifications can be resorted to without departing from the spirit hereof or the scope of the appended claims.

What is claimed is:

1. A beverage container for use with a golf cart or the like having a support member, comprising:
   a) a body having a closed bottom and an open top end;
   b) said body having a first central beverage receiving cavity extending from said top end toward said bottom end and surrounded by an insulated wall;
   c) means for receiving a freezable gel, said means adapted to be disposed within said beverage receiving cavity;
   d) a cap releasably attached to said top end of said body;
   e) a bracket releasably attachable to the support member;
   f) said bracket having at least one concave receiving notch for engaging a round support member and adapter means for engaging a square or flat support member; and g) means for engaging said bracket incorporated into said body.

2. The beverage container of claim 1 wherein said bracket includes a strap portion, and a main body portion with a tapered dovetail notch incorporated therein; and means for receiving said strap portion incorporated in said main body portion.

3. The beverage container of claim 1 wherein said adapter means includes an adapter plate and a pair of slots associated with said concave receiving notch for receipt of said adapter plate.

4. The beverage container of claim 2 wherein said strap portion includes means for fastening said strap around said support member.

5. The beverage container of claim 4 wherein said means for fastening is a hook and loop fastener.

6. The beverage container of claim 2 wherein said means for receiving said strap is a plurality of slots and a plurality of passages incorporated in said main body portion, said slots communicating with one another via said passages.

7. The beverage container of claim 2 wherein said means for engaging said bracket is a tapered dovetail wedge adapted to be matably received in said tapered dovetail notch.

8. The beverage container of claim 1 wherein said means for receiving a freezable gel is a hollow core having a closed top end disposed upwardly and inwardly from the said bottom end of said body.

9. The beverage container of claim 1 wherein said means for receiving a freezable gel is a cavity disposed between the lower end of said beverage receiving cavity and the closed bottom end of said body.

10. The beverage container of claim 1 wherein said cap has a straw receiving aperture; and a vent aperture.

11. The beverage container of claim 1 wherein said cap includes a top wall extending from a high point to a low point; having a straw receiving opening adjacent to said low point; and said cap being variably positionable on said body to vary the location of said straw receiving opening.

12. The beverage container of claim 1 wherein said top end of said body has interrupted threads on its exterior periphery; and said cap has matching interrupted threads on its interior.

* * * * *